UNITED STATES PATENT OFFICE.

LEBERECHT TRALLS, OF DUX, AUSTRIA-HUNGARY.

PROCESS OF OBTAINING FERTILIZERS FROM WASTE LYES.

SPECIFICATION forming part of Letters Patent No. 528,999, dated November 13, 1894.

Application filed April 29, 1893. Serial No. 472,386. (No specimens.) Patented in Belgium January 1, 1893, No. 103,025.

*To all whom it may concern:*

Be it known that I, LEBERECHT TRALLS, of Dux, Bohemia, in the Empire of Austria-Hungary, have invented certain new and useful Improvements in a Process of Utilizing Lyes Containing Salts of Aluminium and Iron, (for which I have obtained Belgian Patent No. 103,025, dated January 1, 1893,) of which the following is a clear and exact description.

My invention has relation to the utilization of the waste or refuse coal generally designated slack or culm, and more particularly to the slack or culm of brown coal.

The waste resulting from the mining of brown coal relatively to the marketable product is comparatively great. In fact, in some cases it reaches as high as thirty per cent. of the marketable coal, which adds very materially to the expenses of mining, and consequently to the cost of the marketable product; but other difficulties entailing additional expenses present themselves in the disposal of this practically enormous mass of waste coal, and various means have been proposed tending to the disposal of said waste with a view to deriving therefrom some profit. To this end I proposed to combine gypsum with the refuse coal, then calcine or burn the mass, either in the heap or in a suitable furnace, with a view to obtaining alum from the lyes obtained by leaching the ashes, as described in German Patent No. 41,352, of January 25, 1887; but here another difficulty presented itself, in that the waste lyes which contain salts of aluminium and iron in the form of sulfates, besides other salts could neither be allowed to run to waste on the ground or into a running stream by reason of the injurious effects of these salts not only on vegetation but also on the animal system, and in such cases where the product of the treatment of the refuse coal, namely the alum, is not needed or required, such treatment is of no value.

My invention has for its object the provision of means whereby the injurious sulfates referred to and contained in any waste lye but more particularly in the lyes obtained by leaching the ashes of brown coal, whether before or after recovery therefrom of alum, are not only rendered harmless to vegetation or to the animal system, but whereby said salts may, by proper conversion become a source of profit. To this end it became necessary to direct the utilization of such lyes toward a final product for which there would be a constant demand, with a view to its rapid disposal, to which end the invention has for its further object the utilization of lyes containing acid salts of aluminium and iron in the form of sulfates for the manufacture of valuable fertilizers, by converting the sulfates into salts that are beneficial to vegetation, which, when eliminated from the mother liquor leave the latter in a condition in which it is absolutely harmless to vegetation as well as to the animal system, while losses of nitrogenous bodies contained in the solutions of lyes, as for instance, ammonia in the free or in a volatile state are prevented, and other oxides that may be contained in said lyes are also rendered harmless.

The invention has for its further object the utilization of other waste lyes or waters, for the purpose of effecting the decomposition of the sulfates, and the manufacture of sulfatic fertilizer.

In agriculture it is important, as is well known, to maintain in the soil a given proportion of nitrogen by means of suitable fertilizers. For this purpose ammoniacal bodies are generally employed, or such bodies in which the nitrogen is contained in the form of ammonia or its carbonate, or in the form of an ammoniacal salt, or in such form as to be readily converted into these bodies. These nitrogenous bodies are contained in the waste lyes resulting from the distillation of coal, peat, bones, &c., and may be generally designated under the name of gas liquor. In carrying out my invention I use these gas liquors for the purpose of decomposing the constituents of the ash lyes of brown coal that are injurious to vegetation and to the animal system and convert the same into a most useful nitrogenous fertilizer, thereby rendering the mother liquor harmless, so that it can be allowed to run to waste either on land or into a running stream. In other words I mix with the brown coal ash lye a sufficient quantity of gas liquor, or ammoniacal lye to bind the whole of the sulfuric acid combined with the aluminium and iron oxid if the latter is present, and convert the same into their hydrates, the liquor being evaporated and the residuum dried. I thus obtain a product that contains in intimate combination sulfate of ammonia, hydrate of alumina, and hydroxid of iron, a form in which they are not only most readily assimilated by plants, but the alkali present preventing the loss of nitrogen. It is well known that a healthy soil should not be acid, but more or less alkaline, lime being freely used for this purpose. The nitrogen in the soil, even if present in the form of ammonia is converted by the lime under the influence of atmospheric air into nitric acid or a nitrate, (provided the lime is not present in excess) said conversion being necessary because the nitrogen is not assimilated by plants except in this form. Hence a basic or alkaline substance should be present, and to this end good soil generally contains free lime. If sulfate of ammonia is added to such soil, the ammonia is liable to be converted into a gaseous form and to escape into the atmosphere wherever an excess of lime is present, thus resulting in a loss of nitrogen. This is effectually prevented by the hydrate of alumina in the described fertilizer, which is an alkaline base, and assists in the formation of nitrates having at the same time the property of the sodium aluminates in preventing the volatilization of the ammonia by the formation of ammonium combinations. On the other hand, the lyes containing the acid salts referred to may first be evaporated, the product of the evaporation being then mixed with the gas liquor.

The object of first evaporating the coal ash lyes or other lyes containing acid salts of aluminium and iron, is to facilitate the transportation thereof to the place where the gas liquor is obtainable where the admixture and the production of nitrogenous fertilizers can then be readily effected. Of course in the final product the ammonia is always present in the form of a sulfate. The final product so obtained may, if desired, be combined with other substances, such, for instance, as contain lime. Some of these, however, owing to their basic nature, give rise to a volatilization of the ammonia, as when soda, caustic lime, or substances containing caustic lime are used, and so entail a loss of ammonia. This may, however, also be avoided by first mixing the lye containing the acid salts of aluminium and iron with the basic material for the purposes of conversion of said salts, and, if so desired, the gas liquor may be added to the solution afterward, and instead of substances containing lime, or in combination with said substances, phosphatic materials may by used, whereby a final product is obtained that is not only rich in calcium, but also in phosphoric acid, as well as nitrogen, the said constituents being intimately combined. In either case the lime is reduced to a form in which it will not drive off the ammonia, so that a loss of the latter is avoided. Consequently the otherwise undesirable waste products resulting from the manufacture of soda, namely the residues containing lime or soda, can also be profitably utilized, in that the waste lyes containing acid salts of aluminium and iron are saturated with the said residues and heated until the chlorine contained in the residues is driven off in the form of hydrochloric acid, whereby a sulfatic fertilizer is obtained. In a like manner other waste lyes containing chlorine may be utilized, as for instance, the waste lyes resulting from the manufacture of potash, from which the chlorine that forms the injurious chlorids can be eliminated by combining such lyes with the waste lyes containing acid salts of aluminium and iron and heating the compound. The latter admixtures may also be saturated with ammoniacal substances, or with substances containing lime, or both.

It will therefore be seen that my invention not only provides for the utilization of waste lyes containing acid salts of alumina and iron, and at the same time renders these lyes harmless to the animal system as well as to vegetation, but also provides a means for profitably utilizing other undesirable waste lyes or waste products, the result being a final product in the form of a fertilizer that finds a ready sale at all times. In this manner the otherwise enormous waste occurring in the mining of coal, and particularly in the mining of brown coal, instead of being a source of expenditures becomes a source of profit, especially when the ammoniacal lyes are produced at or near the mines, as is the case when tar is manufactured from the brown coal.

Having thus described my invention, what I claim as new therein, and desire to secure by Letters Patent, is—

1. The process of obtaining a fertilizer from ammoniacal waste lyes and from lyes containing sulfate of alumina and peroxid of iron, which consists in mixing the two lyes in such proportions as to convert the sulfuric acid combined with the sulfate and peroxid into ammonium sulfate and leave the alumina in the form of a hydrate and the peroxid of iron in the form of a hydroxid, and evaporating to dryness.

2. The herein-described process of obtaining a fertilizer from lyes containing acid salts of alumina, ammonia, and basic substances as lime, which consists in mixing with the lye containing acid salts of alumina a lye containing a basic substance, as lime, driving off the chlorine by means of heat and adding to said mixture an ammoniacal lye, for the purposes stated.

3. The herein-described process of obtaining a fertilizer from lyes obtained by leaching brown coal ashes and containing acid salts of alumina and oxid of iron, and from waste lyes resulting from the distillation of carbonaceous material, as gas liquor, and from waste lyes containing basic substances, as the lyes resulting in the manufacture of soda or potash, which consists in mixing with the lye containing the acid salts of alumina and oxid of iron a lye containing a basic substance, driving off the chlorine by heat, and adding to the mixture an ammoniacal lye in sufficient quantity to convert the sulfuric acid combined with the acid salts and iron into ammonium sulfate, for the purposes set forth.

In testimony whereof I have hereto affixed my signature in presence of two witnesses.

LEBERECHT TRALLS.

Witnesses:
A. SCHLESSING,
F. BELMONT.